(12) United States Patent
Kunisawa et al.

(10) Patent No.: US 7,235,599 B2
(45) Date of Patent: Jun. 26, 2007

(54) RUBBER COMPOSITION AND RACING TIRE HAVING TREAD COMPRISING THEREOF

(75) Inventors: Tetsuya Kunisawa, Kobe (JP); Toshiro Matsuo, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/335,543

(22) Filed: Jan. 20, 2006

(65) Prior Publication Data

US 2006/0189746 A1   Aug. 24, 2006

(30) Foreign Application Priority Data

Feb. 23, 2005   (JP) .............................. 2005-047364

(51) Int. Cl.
   *C08K 3/04*   (2006.01)
   *C08L 81/00*   (2006.01)

(52) U.S. Cl. ...................... 524/495; 524/575; 525/189; 525/332.6; 525/343; 152/209.1; 152/905

(58) Field of Classification Search ................ 524/495, 524/575; 525/332.6, 343, 189; 152/209.1, 152/905
See application file for complete search history.

(56) References Cited

U.S. PATENT DOCUMENTS

| 4,421,899 | A | 12/1983 | Yamazaki et al. |
| 6,533,008 | B1 * | 3/2003 | Lickes et al. ............ 152/209.5 |
| 6,617,384 | B2 * | 9/2003 | Wakabayashi et al. ...... 524/302 |
| 2005/0096424 | A1 * | 5/2005 | Otsuji et al. ................ 524/496 |

FOREIGN PATENT DOCUMENTS

| EP | 0 831 123 A | 3/1998 |
| JP | 57-170939 A | 10/1982 |
| JP | 7-179669 A | 7/1995 |
| JP | 10-251456 A | 9/1998 |
| JP | 2000-119400 A | 4/2000 |
| JP | 2000-309665 A | 11/2000 |
| JP | 2002-20550 A | 1/2002 |
| JP | 2003-73502 A | 3/2003 |

OTHER PUBLICATIONS

"Table of Asadene and Asaprene butadiene rubber (BR) Grades", Internet Article, [Online], Dec. 27, 2002, pp. 1-2, XP002381596.
Canning S P American Society for Testing and Materials: "1991 Annual Book of ASTM Standards, vol. 09.01" Rubber, Natural and Synthetic—General Test Methods; Carbon Black, Includes Standards on Following Committees: D11 on Rubber, D 24 on Carbon Black, Annual Book of ASTM Standards, Philadelphia, ASTM, US, vol. 9, p. 317, (1991), XP 002351270.

* cited by examiner

*Primary Examiner*—Fred Teskin
(74) *Attorney, Agent, or Firm*—Birch, Stewart, Kolasch & Birch, LLP

(57) ABSTRACT

There is provided a racing tire improving grip performance, processability and rubber strength at a high temperature in highly good balance and a rubber composition capable of producing a tread having thereof. A rubber composition comprising 70 to 150 parts by weight of carbon black with a nitrogen adsorption specific area of 100 to 300 $m^2/g$ based on 100 parts by weight of a rubber component comprising a solution polymerization styrene-butadiene rubber satisfying the formula below:

(Vinyl content) $\geq$ 100−2×(styrene content), 30 to 170 parts by weight of a softener and 1 to 30 parts by weight of a compound satisfying the general formula (1):

$$-(R-S_x)_n- \qquad (1)$$

(wherein R is $$-(CH_2-CH_2-O)_m-CH_2-CH_2-$$

, x is an integer of 3 to 6, n is an integer of 10 to 400 and m represents an integer of 2 to 5.).

13 Claims, No Drawings

RUBBER COMPOSITION AND RACING TIRE HAVING TREAD COMPRISING THEREOF

BACKGROUND OF THE INVENTION

The present invention relates to a rubber composition and a racing tire having a tread comprising thereof.

DESCRIPTION OF THE RELATED ART

Since the temperature of a rubber during running is often 100° C. or more in case of racing tires (for a race), it is subject to very strong stimulation. Thereby, the abrasion of tires proceeds and it causes lowering of the grip (grip performance) of tires. Accordingly, it is necessary to improve strength (durability) of a tread rubber at high temperature in order to further keep the grip.

As a method of improving durability, it is generally known that carbon black as a filler for reinforcement is used much. However, when a large quantity of carbon black is used, the hardness of a rubber becomes too hard to lower grip performance and there remains a problem of processability due to raising of viscosity of an uncured rubber is provoked.

Further, the JP-A-7-179669 discloses a tread rubber composition comprising a solution polymerization styrene-butadiene rubber and carbon black, but there has been a problem that the strength and grip performance of a tread rubber obtained from the tread rubber composition are not sufficient.

SUMMARY OF THE INVENTION

It is the object of the present invention to provide a racing tire improving grip performance, processability and rubber strength at a high temperature in highly good balance and a rubber composition capable of producing the tread of a racing tire.

The present invention relates to a rubber composition comprising 70 to 150 parts by weight of carbon black with a nitrogen adsorption specific area of 100 to 300 m$^2$/g based on 100 parts by weight of a rubber component comprising a solution polymerization styrene-butadiene rubber satisfying the following formula:

(Vinyl content)≧100−2×(styrene content), 30 to 170 parts by weight of a softener and 1 to 30 parts by weight of a compound satisfying the general formula (1):

$$-(R-S_x)_n- \quad (1)$$

(wherein R is $$-(CH_2-CH_2-O)_m-CH_2-CH_2-$$

, x is an integer of 3 to 6, n is an integer of 10 to 400 and m represents an integer of 2 to 5.).

Further, the present invention relates to a racing tire having a tread comprising the fore-mentioned rubber composition.

DESCRIPTION OF THE PREFERRED EXAMPLE

The rubber composition of the present invention comprises a rubber composition, carbon black, a softener and a compound (hereinafter, referred to as compound 1) satisfying the general formula (1):

$$-(R-S_x)_n- \quad (1)$$

(wherein R is $$-(CH_2-CH_2-O)_m-CH_2-CH_2-$$

, x is an integer of 3 to 6, n is an integer of 10 to 400 and m represents an integer of 2 to 5.).

The rubber component comprises the solution polymerization styrene-butadiene rubber (hereinafter referred to as S-SBR). An emulsion polymerization SBR (hereinafter referred to as E-SBR) is also known additionally as SBR, but E-SBR generates problems that continuousness of grip performance is inferior to S-SBR and blow performance (a rubber is foamed to lower strength) is inferior at a very high temperature condition (around 150° C.) to S-SBR; therefore S-SBR is preferably used for the rubber composition of the present invention.

The styrene content of S-SBR is preferably 25 to 45%. When it is less than 25%, the grip performance is lowered; therefore it does not tend to be suitable for a racing tire. When it exceeds 45%, abrasion resistance tends to be deteriorated. Further, the styrene content is calculated by NMR measurement.

The vinyl content of S-SBR is preferably 30 to 75%. When the vinyl content is less than 30%, the grip performance tends to be lowered and when it exceeds 75%, the grip performance tends to be lowered because a rubber is extremely hardened at a low temperature. Further, the vinyl content of S-SBR indicates the vinyl content of a butadiene portion and is calculated by H-NMR measurement.

S-SBR preferably satisfies the following formula.

(Vinyl content)≧100−2×(styrene content)

When S-SBR does not satisfy the fore-mentioned formula, the grip performance does not tend to be adequately obtained.

The content of S-SBR is preferably 90% by weight or more in the rubber component and more preferably 95% by weight or more. When the content ratio is less than 90% by weight, the grip performance enough for being used as a racing tire does not tend to be obtained. Further, the content of S-SBR is most preferably 100% by weight.

As the rubber component, diene rubbers such as NR and BR can be additionally contained together with S-SBR.

The nitrogen adsorption specific area (N$_2$SA) of carbon black is 100 m$^2$/g or more and preferably 125 m$^2$/g or more. When N$_2$SA is less than 100 m$^2$/g, the abrasion resistance and grip performance become inferior. Further, N$_2$SA of carbon black is preferably 300 m$^2$/g or less and more preferably 290 m$^2$/g or less. When N$_2$SA exceeds 300 m$^2$/g, a problem occurs in processability because viscosity in a rubber at kneading is extremely raised.

The content of carbon black is 70 parts by weight or more based on 100 parts by weight of the rubber component and preferably 80 parts by weight or more. When the content is less than 70 parts by weight, it is not preferable because the grip performance is lowered and abrasion resistance is deteriorated. Further, the content of carbon black is 150 parts by weight or less based on 100 parts by weight of the rubber component and preferably 145 parts by weight or less. When the content exceeds 150 parts by weight, the rubber is extremely hardened and the lowering of grip and processability are not good.

The softener includes a softener such as a process oil which is generally used in the rubber industry.

The content of the softener is 30 parts by weight or more based on 100 parts by weight of the rubber component and preferably 40 parts by weight or more. When the content is less than 30 parts by weight, the rubber is too hard and the grip performance is poor. Further, the content of the softener is 170 parts by weight or less based on 100 parts by weight of the rubber component and preferably 160 parts by weight or less. When the content exceeds 170 parts by weight, the abrasion resistance is poor because the rubber is extremely softened. Further, when those containing oil in a rubber component (for example, T4350 manufactured by Asahi Kasei Corporation and the like) is used, the content of the softener is an amount including the content of an oil in the rubber component.

The compound 1 used in the present invention satisfies the general formula (1):

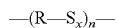  (1)

(wherein R is

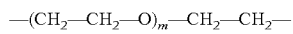

, x is an integer of 3 to 6, n is an integer of 10 to 400 and m represents an integer of 2 to 5.).

In the general formula (1), X is an integer of 3 to 6 and preferably an integer of 3 to 5. When x is less than 3, vulcanization becomes late and when x exceeds 6, it is difficult to produce the rubber composition.

In the general formula (1), n is an integer of 10 to 400 and preferably an integer of 10 to 300. When n is less than 10, the compound 1 is easily volatile and difficultly handled and when n exceeds 400, compatibility with the rubber is deteriorated.

In the general formula (1), m is an integer of 2 to 5, preferably an integer of 2 to 4 and more preferably an integer of 2 to 3. When m is less than 2, the bending performance of the rubber composition obtained tends to be lowered and when m exceeds 5, the adequate hardness of the rubber composition does not tend to be obtained.

The content of the compound 1 is 1 part by weight or more based on 100 parts by weight of the rubber component and preferably 1.5 parts by weight or more. When the content is less than 1 part by weight, the adequate grip performance and rubber strength are not obtained. Further, the content of the compound 1 is 30 parts by weight or less based on 100 parts by weight of the rubber component and preferably 25 parts by weight or less. When the content exceeds 30 parts by weight, the grip performance is lowered and adequate rubber strength is not obtained.

Crosslinking units shown below can be introduced into the rubber by compounding the compound 1 with the rubber composition of the present invention, and reversion can be greatly suppressed without influencing on vulcanization speed and scorch. Further, the heat resistance of the rubber composition which is not adequately obtained by general sulfur crosslinking and resistance for dynamic stress can be obtained. Further, since it hardly blooms, a good rubber composition in appearance can be also obtained.

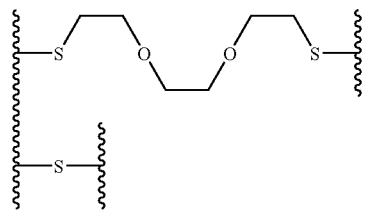

The compound 1 is preferably added under a temperature condition of 80 to 130° C. at production of the rubber composition and is kneaded. When the temperature is less than. 80° C., suitable kneading is not carried out and when it exceeds 130° C., vulcanization is initiated; therefore a problem that adequate kneading is not carried out occurs.

In the rubber composition of the present invention, fillers for reinforcement such as silica and clay, wax, an antioxidant, stearic acid, zinc oxide, sulfur, a vulcanization accelerator and the like can be compounded, if necessary, in addition to the fore-mentioned rubber component, carbon black, a softener and the compound 1.

The racing tire of the present invention has preferably a tread comprising the fore-mentioned rubber composition. The racing tire means specifically tires which are mounted on a vehicle body such as a two-wheel vehicle for racing and a four-wheel vehicle for racing. The tread is prepared by molding the fore-mentioned rubber composition to a predetermined shape and vulcanizing it.

EXAMPLES

The present invention is specifically explained based on Examples, but the present invention is not limited only thereto.

Various chemicals used in Examples are described below.

S-SBR: T4350 (50 parts by weight of a process oil is contained based on 100 parts by weight of a polymer content; a vinyl content of 40%; a styrene content of 39%) manufactured by Asahi Kasei Corporation. Carbon black: N110, manufactured by Showa Cabot K. K. ($N_2SA$ of 130 $m^2/g$).

Process oil: DIANA PROCESS manufactured by Idemitsu Kosan Co., Ltd.

Wax: SUNNOC WAX, manufactured by OUCHISHINKO CHEMICAL INDUSTRIAL CO., LTD.

Antioxidant: SANTOFLEX 13 manufactured by Flexsys K. K.

Stearic acid: KIRI manufactured by NOF Corporation.

Zinc oxide: Zinc Oxide No. 2 manufactured by Mitsui Mining And Smelting Corporation, Limited.

Sulfur: Sulfur manufactured by Karuisawa Refinery Inc.

Compound 1: 2OS4 Polymer (m=2,x=4 and n=200) manufactured by Kawaguchi Chemical Industry Co., Ltd.

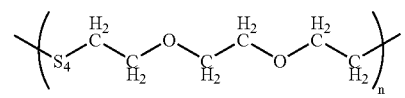

Vulcanization accelerator 1: NOCCELER NS manufactured by Ouchishinko Chemical Industrial CO., LTD.

Examples 1 to 4 and Comparative Examples 1 to 3

The fore-mentioned various chemicals excluding sulfur, the compound 1 and a vulcanization accelerator were kneaded with 1.7 L Banbury mixer manufactured by Kobe Steel Ltd. at 150° C. for 5 minutes according to the respective compounding contents shown in Table 1. To the obtained kneaded product were added sulfur, the compound 1 and a vulcanization accelerator were added the kneaded article obtained and kneaded with a twin roller at 105° C. for 3 minutes. The kneaded mixture was vulcanized at 175° C. for 15 minutes to obtain the rubber compositions. Tests below were carried out using the obtained rubber compositions.

(Tensile Test)

Tensile test was carried out in accordance with JIS-K6251 using the fore-mentioned rubber compositions which were molded into a No. 3 dumbbell at 100° C. It is indicated that the higher the respective values for strength at break (MPa) and elongation at break (%) are, the more preferable they are.

(Grip Performance)

Tires (tire size: 180/55ZR17) for the rear tire of a two-wheel vehicle having a tread comprising the rubber compositions of Examples 1 to 4 and Comparative Examples 1 to 3 were respectively prepared according to a usual method. Further, sensual test was carried out on a circuit using a vehicle for race on which the tire was mounted. Comparative Example 1 was assumed to as 6 point and the respective Examples were relatively evaluated. The higher the point is, the better the grip performance is.

Measurement Results are Shown in Table 1.

TABLE 1

|  | Ex. | | | | Com. Ex. | | |
| --- | --- | --- | --- | --- | --- | --- | --- |
|  | 1 | 2 | 3 | 4 | 1 | 2 | 3 |
| Compounding (parts by weight) | | | | | | | |
| S-SBR | 150 | 150 | 150 | 150 | 150 | 150 | 150 |
| Carbon black | 90 | 90 | 90 | 90 | 90 | 90 | 90 |
| Process oil | 40 | 40 | 40 | 40 | 40 | 40 | 40 |
| Wax | 2 | 2 | 2 | 2 | 2 | 2 | 2 |
| Antioxidant | 2 | 2 | 2 | 2 | 2 | 2 | 2 |
| Stearic acid | 2 | 2 | 2 | 2 | 2 | 2 | 2 |
| Zinc oxide | 3 | 3 | 3 | 3 | 3 | 3 | 3 |
| Sulfur | 1.4 | — | — | — | 1.9 | 1.6 | — |
| Compound 1 | 1 | 5 | 10 | 30 | — | 0.5 | 35 |
| Vulcanization accelerator | 2.5 | 2.5 | 2.5 | 2.5 | 2.5 | 2.5 | 2.5 |
| Evaluation result | | | | | | | |
| Grip performance | 6.5 | 7 | 7.5 | 7 | 6 | 6 | 5.5 |
| Strength at break (MPa) | 8.3 | 8.6 | 9.0 | 8.5 | 8.0 | 8.1 | 8.8 |
| Elongation at break (%) | 485 | 500 | 580 | 510 | 475 | 475 | 460 |

Rubber strength and grip performance in Examples 1 to 4 are improved in good balance.

On the other hand, rubber strength and grip performance are hardly improved in Comparative Example 2.

Further, strength at break is enlarged in Comparative Example 3, but elongation at break becomes insufficient and further, grip performance is also lowered.

According to the present invention, there can be provided a racing tire improving grip performance, processability and rubber strength at high temperature in highly good balance and a rubber composition capable of producing the tread of a racing tire, by containing a specific solution polymerization styrene-butadiene rubber, carbon black, a softener and a vulcanization agent.

What is claimed is:

1. A rubber composition comprising 70 to 150 parts by weight of carbon black with a nitrogen adsorption specific area of 100 to 300 m2/g based on 100 parts by weight of a rubber component comprising a solution polymerization styrene-butadiene rubber satisfying the formula below:

(Vinyl content)≧100 −2 x(styrene content), 30 to 170 parts by weight of a softener and 1 to 30 parts by weight of a compound satisfying the general formula (1):

—(R-$S_x$)$_n$—     (1)

(wherein R is

—(CH$_2$—CH$_2$—O)$_m$—CH$_2$—CH$_2$—

, x is an integer of 3 to 6, n is an integer of 10 to 400 and m represents an integer of 2 to 5.

2. A racing tire having a tread comprising the rubber composition according to claim 1.

3. The rubber composition according to claim 1, wherein x is an integer of 3 to 5.

4. The rubber composition according to claim 1, wherein n is an integer of 10 to 300.

5. The rubber composition according to claim 1, wherein m is an integer of 2 to 4.

6. The rubber composition according to claim 1, wherein m is an integer of 2 to 3.

7. The rubber composition according to claim 1, wherein x is an integer of 3 to 5, n is an integer of 10 to 300, m is an integer of 2 to 4 and m is an integer of 2 to 3.

8. A racing tire according to claim 2, wherein x is an integer of 3 to 5.

9. A racing tire according to claim 2, wherein n is an integer of 10 to 300.

10. A racing tire according to claim 2, wherein m is an integer of 2 to 4.

11. A racing tire according to claim 2, wherein m is an integer of 2 to 3.

12. The rubber composition according to claim 1, wherein the compound of general formula (1) is:

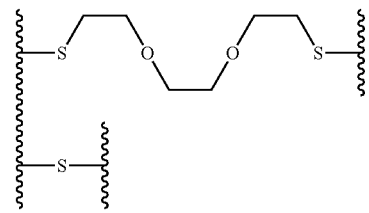

13. A racing tire according to claim 2, wherein the compound of general formula (1) is:

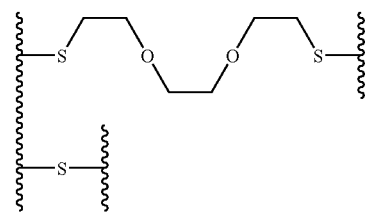

* * * * *